(12) United States Patent
Kartes et al.

(10) Patent No.: US 11,518,224 B2
(45) Date of Patent: Dec. 6, 2022

(54) DUAL MODE, EASY TO SERVICE TARP

(71) Applicant: Roll Rite LLC, Gladwin, MI (US)

(72) Inventors: Scott Kartes, West Branch, MI (US); Shane Hines, West Branch, MI (US); Stephen Hunter, Midland, MI (US)

(73) Assignee: Roll Rite LLC, Gladwin, MI (US)

( * ) Notice: Subject to any disclaimer, the term of this patent is extended or adjusted under 35 U.S.C. 154(b) by 176 days.

(21) Appl. No.: 15/733,452

(22) PCT Filed: Feb. 1, 2019

(86) PCT No.: PCT/US2019/016355
§ 371 (c)(1),
(2) Date: Jul. 31, 2020

(87) PCT Pub. No.: WO2019/152844
PCT Pub. Date: Aug. 8, 2019

(65) Prior Publication Data
US 2020/0361297 A1    Nov. 19, 2020

Related U.S. Application Data

(60) Provisional application No. 62/625,357, filed on Feb. 2, 2018.

(51) Int. Cl.
*B60J 7/10* (2006.01)
*B60J 7/08* (2006.01)

(52) U.S. Cl.
CPC ............ *B60J 7/104* (2013.01); *B60J 7/085* (2013.01)

(58) Field of Classification Search
CPC ............ B60J 7/085; B60J 7/102; B60J 7/104
USPC ........................................................ 296/98
See application file for complete search history.

(56) References Cited

U.S. PATENT DOCUMENTS

| | | | | |
|---|---|---|---|---|
| 2,846,262 A * | 8/1958 | Ray | ............... | B60P 3/38 |
| | | | | 135/88.13 |
| 3,829,154 A * | 8/1974 | Becknell | ............... | B60J 7/068 |
| | | | | 296/100.12 |
| 4,200,330 A * | 4/1980 | Scott | ............... | B60P 7/02 |
| | | | | 296/100.1 |
| 4,639,033 A * | 1/1987 | Wheatley | ............... | B60P 7/04 |
| | | | | 296/100.18 |

(Continued)

FOREIGN PATENT DOCUMENTS

| | | |
|---|---|---|
| DE | 8508298 | 5/1985 |
| EP | 2644421 | 10/2019 |
| JP | S49133312 | 11/1974 |

*Primary Examiner* — Jason S Morrow
(74) *Attorney, Agent, or Firm* — Miller Canfield

(57) ABSTRACT

A tarp for a vehicle bed is developed for engagement with a reel that is rotated by a motor for rolling and unrolling the tarp across a vehicle bed. When the tarp has been unrolled and fully covers the vehicle bed, the tarp stretches across the vehicle bed and has side edges supported upon the respective upper edges of the bed side walls. The features or structures of the tarp that are kinematic are designed such that they may be permanently attached to the other members in the machine or tarp system, which thereby meets functional needs of the tarp, and provide long term consistent deployment of the tarp covering sections. The material used in this kinematic part of the tarp is chosen such that the life of this component is improved. Additionally, covering sections are provided in this tarp configuration.

15 Claims, 12 Drawing Sheets

(56) References Cited

U.S. PATENT DOCUMENTS

| | | | | |
|---|---|---|---|---|
| 4,639,035 | A | * | 1/1987 | Isaacson .................. B60J 7/104 296/213 |
| 4,709,956 | A | | 12/1987 | Bowman |
| 4,938,523 | A | | 7/1990 | Camp |
| 5,056,855 | A | * | 10/1991 | Moravsky ................ B60J 7/104 296/105 |
| 5,988,195 | A | * | 11/1999 | Kaestner ................. E04H 15/06 135/88.13 |
| 6,199,935 | B1 | * | 3/2001 | Waltz ....................... B60J 7/085 296/98 |
| 6,851,739 | B2 | * | 2/2005 | Morley .................... B60J 7/106 296/141 |
| 7,189,042 | B1 | * | 3/2007 | Schmit .................. B60P 7/0823 410/97 |
| 10,005,347 | B1 | * | 6/2018 | Singer ...................... B60J 7/041 |
| 10,787,131 | B2 | * | 9/2020 | Marchlewski ............ B60R 9/04 |
| 10,821,814 | B2 | * | 11/2020 | Spencer ............. A44B 18/0049 |
| 11,084,361 | B2 | * | 8/2021 | Dylewski, II ............ B60J 7/085 |
| 2005/0067854 | A1 | | 3/2005 | Lester et al. |
| 2010/0283285 | A1 | * | 11/2010 | Cramaro .................. B60J 7/085 296/98 |
| 2016/0332556 | A1 | | 11/2016 | Robertson |
| 2021/0001699 | A1 | * | 1/2021 | Spencer ............. A44B 18/0015 |
| 2022/0025700 | A1 | * | 1/2022 | Reeder .................. B65D 90/66 |

* cited by examiner

DUAL MODE, EASY TO SERVICE TARP

FIELD OF THE INVENTION

The invention relates to vehicle cover or tarp system, and more particularly, to a multi-component tarp for a vehicle bed of a truck or trailer.

BACKGROUND OF THE INVENTION

Many trucks, particularly those hauling loose loads, such as sand and gravel, in a truck bed or a bed of a trailer need a vehicle cover or tarp to prevent the wind from blowing load particles off the load bed. Various apparatus have been devised for covering a truck load. In some tarp systems, the tarp is manually rolled and unrolled over the vehicle bed to uncover and cover the vehicle bed. Some such apparatus include a motor for selectively winding a flexible cover or tarp. An effective truck cover should be one which is automated and easily operated by the truck driver so as to selectively cover and uncover the truck bed from the convenient location of the truck cab.

As one example of an automated tarp, U.S. Pat. No. 5,031,955 discloses a truck cover having a motor which may be conveniently operated from the cab of a truck to extend the cover from a winding assembly proximate the front of the truck bed and toward the rear of the truck bed. This '955 patent is hereby incorporated by reference.

Side-to-side systems also exist that cover the vehicle bed from side to side. For instance, U.S. Pat. No. 5,328,228 shows a cover for truck bed and cargo. Similarly, U.S. Pat. No. 5,924,758 shows a roll assist mechanism for tarp systems. Further, U.S. Pat. Nos. 6,206,449 and 6,527,331, the disclosures of which are also hereby incorporated by reference, show a side-to-side truck cover system including a pair of arms, each of which includes a base and an extension. Further, a known side-to-side truck cover system is disclosed in U.S. Pat. No. 6,783,168, and also shown in FIG. 1 of this disclosure, wherein the disclosure of the '168 patent is incorporated herein by reference in its entirety.

In known configurations, a tarp reel may be rolled across the vehicle bed toward one bed wall and engages with a bracket on the bed wall to support the reel when the tarp is unrolled. Generally, a motor may work to continue to rotate the reel against the bracket, which increases tension on the tarp until the motor reaches a limit and stops.

In more detail, manual side rolling tarp systems include tarps that contain features which ensure proper coverage of the vehicle bed or container and provide robustness to the tarp to survive environmental factors such as wind and inclement weather, and ensure long lasting durable performance With the advent of automated side rolling tarp systems, such tarp systems incorporate a reel and an arm assembly that supports the reel, wherein the arm assembly may include a front arm and a rear arm that support the reel or axle therebetween. Such automated tarp systems incorporate an electro-mechanized power source such as a motor, as well as stored spring energy within the arm assembly, wherein the power source, spring energy and the kinematics of the machinery work in concert to produce several outcomes including: cover the vehicle bed or container evenly; tighten or tension the cover; and lock the tarp reel or axle into position to hold the tension on the cover when covering the vehicle bed. These outcomes, when incorporated into an automated machine, impose new requirements on the automated tarp, which are not necessarily imposed on the manual side roll tarp.

These requirements of the automated tarp include covering the vehicle bed or box evenly, which further requires sealing the load in the vehicle bed or container, and avoiding wrinkles in the tarp when unrolled, which wrinkles can otherwise lead to abnormal tarp wear. Such systems may further require that the automated tarp contribute to the kinematic paths of the other members of the tarp rolling apparatus or machine, whereby: the tarp may serve to maintain the path and trajectory of the front and rear arms of the arm assembly, and the reel supported thereby; kinetic force in the tarp system may be imposed on the reel or axle and distributed across force management features in the automated tarp during lock down, which might not be required in a manual system; and static force may need to be distributed across the tarp while the vehicle is in motion.

These requirements imposed on the automated tarp in comparison to the manual tarp are typically met by design features which make the automated tarp unique. For example, automated tarps have resulted in the development of reel (or axle) to tarp attachment features that manage load dispersal in the tarp, and the development of alignment features in the tarp that manages kinematic paths. However, to date, it has been a problem that the development of these design features resulted in increasing tarp change-over service times, which has been a major issue with the serviceability of automated tarp systems.

Therefore, it is an object to overcome disadvantages associated with automated tarp systems and satisfy the unique requirements thereof.

SUMMARY OF THE INVENTION

The present invention relates to a tarp system and in particular, to an improved tarp for covering a vehicle bed. Generally, the inventive tarp is developed for engagement with a reel that is rotated by a motor for rolling and unrolling the tarp across a vehicle bed. When the tarp has been unrolled and fully covers the vehicle bed, the tarp stretches across the vehicle bed and has side edges supported upon the respective upper edges of the bed side walls.

As noted above, the construction of an automated tarp has specific requirements, and known disadvantages preferably are avoided. As a solution to a number of such problems, the inventive tarp is not formed as a single, unitary sheet, but instead has a multi-component design which provides significant advantages. Generally, the inventive tarp functionally decomposes or separates the functions and features of the tarp that provide kinematic support from the functions and features that provide covering support as will be described further herein. The tarp adds design features which allow detachment of the "covering" sections of the tarp, which may be service panels that primarily function to cover the vehicle bed, from the features or structures which provide "kinematic" support to the tarp rolling system or machine. In this regard, the covering features preferably are designed as incremental or modular panels which are lightweight, easy to handle, and easy to remove and replace quickly from the kinematic structures of the tarp.

The features or structures of the tarp that are kinematic are designed such that they may be permanently attached to the other members in the machine or tarp system, which thereby meets functional needs of the tarp, and provide long term consistent deployment of the tarp covering sections. The material used in this kinematic part of the tarp is chosen such that the life of this component is improved.

With this modular design, the service time to replace the tarp is significantly reduced. The components whose function is mainly kinematic typically are not changed as a wear out item. For example, during change out or replacement of the panels, the reel or axle and the attachment of the tarp to the trailer does not need to occur to change the panels. As such, the components whose function is to cover and seal the vehicle bed can be readily changed as needed due to wear out without requiring replacement of the kinematic support structures.

In an alternate modular design, the automated tarp may be formed from multiple tarp panels which are edge connected to form a complete tarp. Each tarp panel can include both kinematic and covering features, wherein the multiple panels are edge connected one to the other to form the complete tarp. Here again, with this modular design, the service time to replace the tarp is significantly reduced since the individual tarp panels can be replaced separate from the other panels in the event of wear or damage.

Other objects and purposes of the invention, and variations thereof, will be apparent upon reading the following specification and inspecting the accompanying drawings.

BRIEF DESCRIPTION OF THE DRAWINGS

The above-mentioned and other features of this disclosure and the manner of obtaining them will become more apparent, and the disclosure itself will be best understood by reference to the following descriptions of systems taken in conjunction with the accompanying figures, which are given as non-limiting examples only, in which.

Figure 1:
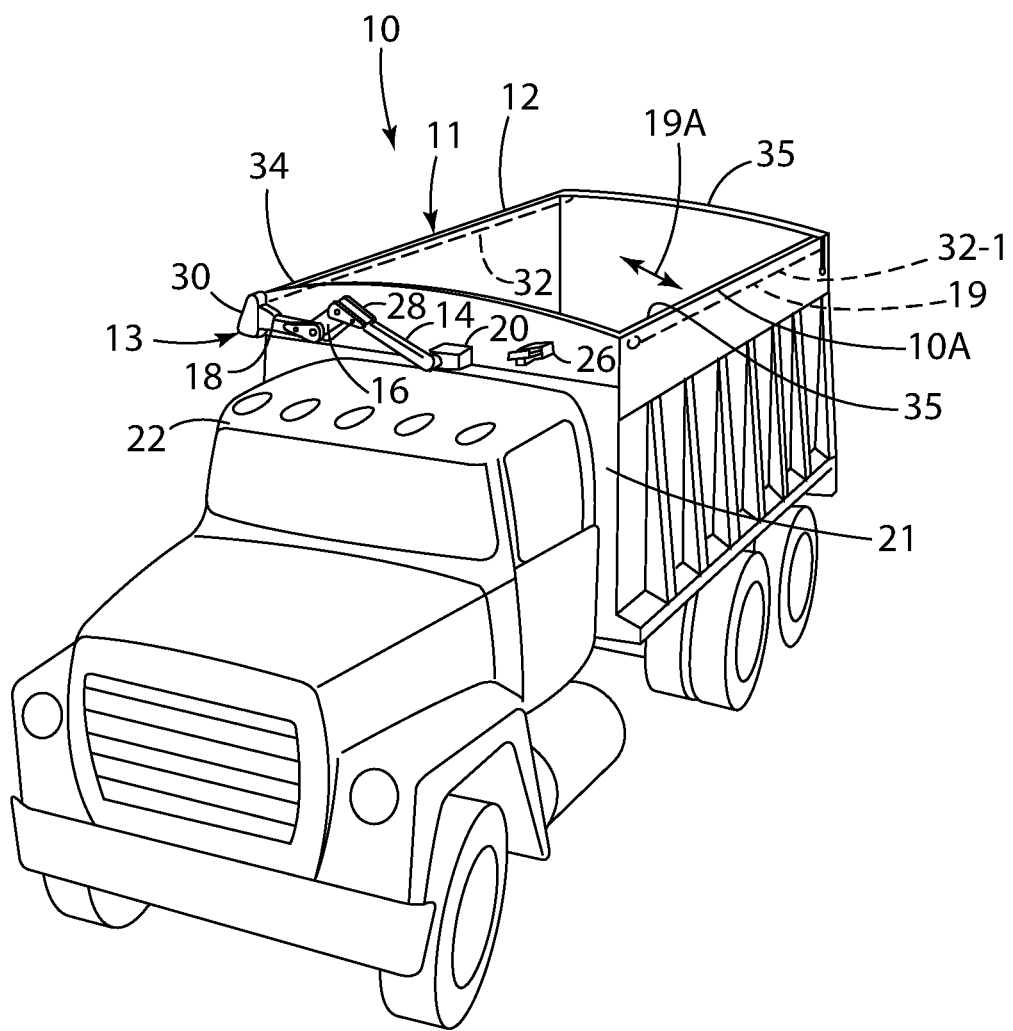
FIG. 1 is a perspective view illustrating a known prior art tarp rolling system on the bed of a vehicle, which in this example is a truck bed.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to the figures, the invention relates to an improved vehicle bed covering system which includes an improved automated tarp for covering a vehicle bed such as a truck or trailer bed.

FIG. 1 shows a known truck or vehicle 10 with a prior art cover or tarp system with a roll-up tarp or cover assembly 11 having a rotatable reel 12 supported on an arm assembly 13 that governs movement of the reel 12 from one side of the vehicle 10 to the other side. The arm assembly 13 comprises a base segment 14, an intermediate segment 16 and an extension 18 which are pivotally connected together and articulate to move the reel 12 side-to-side across the vehicle bed 10A for rolling and unrolling a flexible tarp 19 to and from the reel 12. As indicated by reference arrow 19A, the tarp 19 can be pulled sideways, such as from the passenger side to the driver side of the vehicle 10 as indicated by arrow 19A to unroll the tarp 19 from the reel 12 and cover the vehicle bed or box 10A. Further, the tarp 19 can be pulled sideways in the reverse direction, such as from the driver side back to the passenger side, as also indicated by arrow 19A, to roll up the tarp 19 onto the reel 12 and uncover the vehicle bed or box 10A. This general type of side-to-side tarp system is known in the art. While the vehicle bed 10A is shown as a truck bed in this configuration, the vehicle bed 10A may be any vehicle bed for transporting loads such as a trailer bed.

To cover and uncover the vehicle bed 10A, the tarp assembly 11 includes the rotatable reel 12 rotatably supported on the arm assembly 13 wherein the tarp 19 is fully wound onto the reel 12 when in the uncovered position. In turn, the tarp 19 can be unrolled from the reel 12 to cover the vehicle bed 10A as described further below. While the tarp assembly 11 and reel 12 are positioned on the passenger side of the vehicle 10 when in the uncovered position as shown, the skilled artisan will understand that the tarp system can be reversed wherein the tarp assembly 11 can be mounted on the opposite, driver side of the vehicle. The present invention is not limited to the particular position of the tarp assembly 11 on one side of the vehicle or the other. Similarly, the present disclosure describes the vehicle as being a truck with the vehicle bed 10A mounted to the chassis, but the disclosure is not so limited to this configuration. The skilled artisan will appreciate that the vehicle may be a trailer having a box-like trailer bed to which the tarp assembly 11 is mounted on either the passenger side or driver side as defined relative to the truck or other vehicle hauling the trailer.

With respect to the arm assembly 13, the base 14 is mounted to the truck 10 by a base plate 20 preferably mounted to a front wall 21 of the vehicle bed 10A proximate a top of a cab 22 of the truck 10. The arm assembly 13 includes a motor 30 mounted on the distal end of the extension 18. One fixed end of the tarp 19 can be releasably fixed at one or more points along a line below the top bed edge 34 of one side of the vehicle bed 10A proximate the reel 12, wherein the other free end 32 of the tarp 19 is fixed to the reel 12 so as to roll onto and off of the reel 12. The rotatable reel 12 is rotatably supported by the extension 18 and rotatably driven by the motor 30, so as to function as a take-up spool for rolling and unrolling the tarp 19 during uncovering and covering of the vehicle bed 10A. To cover the vehicle bed 10A, the reel 12 can be displaced by the arm assembly 13 from an uncovered position adjacent the top bed edge 34 toward the other top bed edge 35. As the reel 12 travels between the bed edges 34 and 35, the tarp edge 32 moves with the interconnected reel 12 to cover the vehicle bed 10A. For illustrative purposes, FIG. 1 shows the tarp edge 32 in a closed or covered position adjacent the top bed edge 35 as indicated by reference arrow 32-1, wherein the vehicle bed 10A is fully covered by the tarp 19. In this position, the tarp 19 sits upon and may slide across the top bed edges 34 and 35.

To displace the reel 12 from one vehicle side to the other, the arm assembly 13 has the base segment 14, intermediate segment 16 and the extension 18 pivotally joined together in a known manner so that the arm assembly 13 swings or pivots about the base plate 20 to displace the reel 12 from one side of the vehicle to the other. In this regard, the motor 30 on extension 18 may be powered, from within or out of the cab of the truck 10, to facilitate this operation. This is one example of a side-to-side tarp system compatible with the present enhancements.

Figure 2:
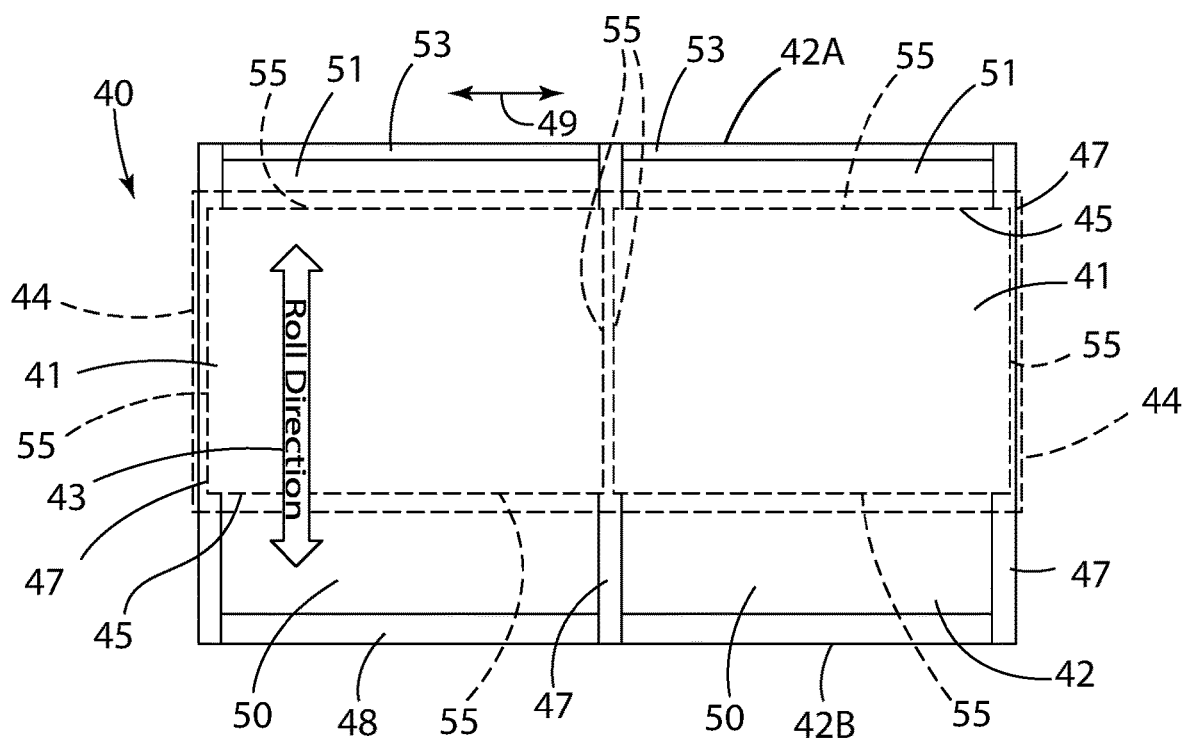
FIG. 2 is a plan view of a first embodiment of an automated tarp of the present invention having service panels removably mountable to a tarp frame.
Figure 3:
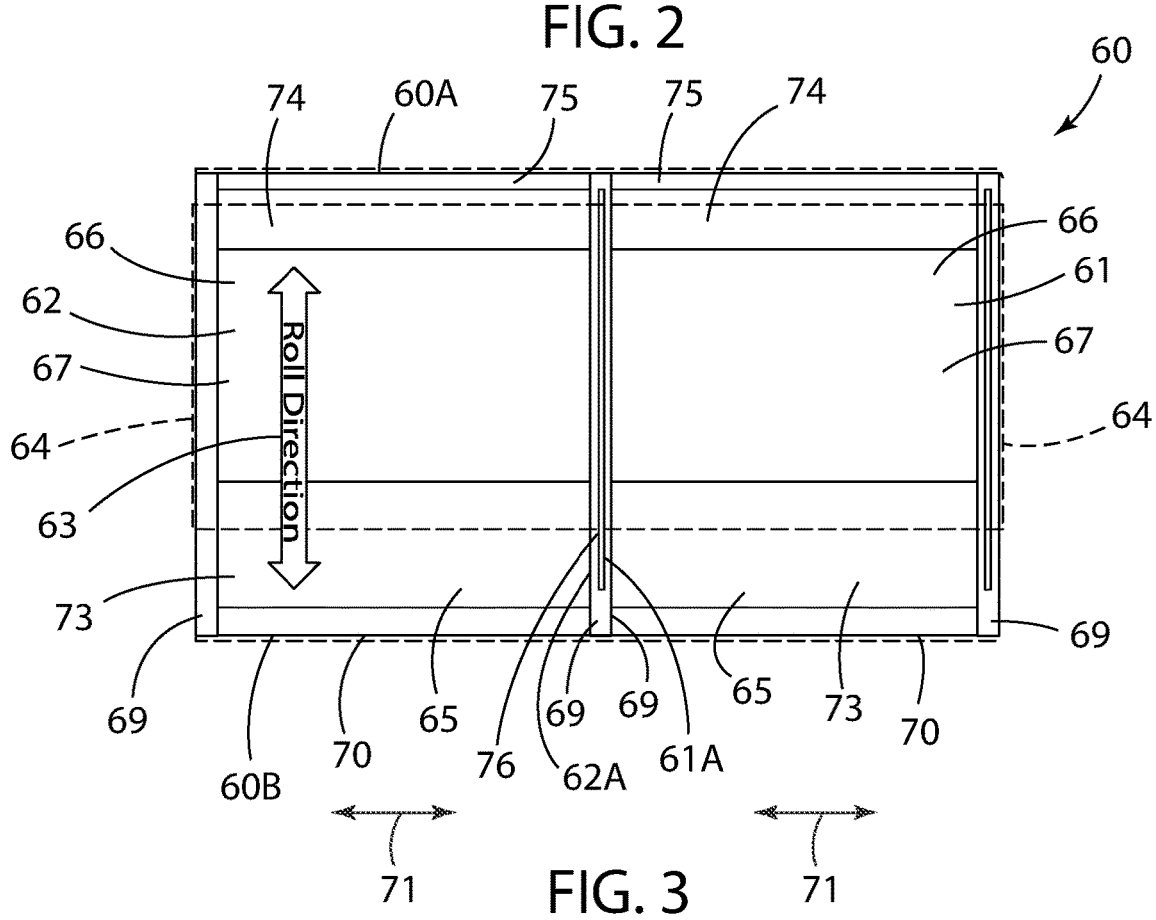
FIG. 3 is a plan view of a second embodiment of an automated tarp having interlocking, edge-connected tarp panels.
Figure 4:
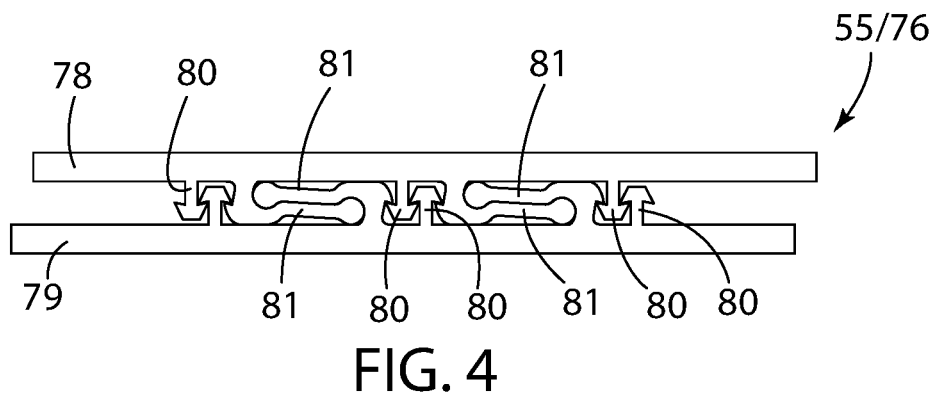
FIG. 4 is an end view of a first embodiment of an interlocking panel connector for the first and second embodiments of the inventive tarp.

Referring to FIGS. 2-4, FIG. 2 is a plan view of a first embodiment of an automated tarp 40 of the present invention having service panels 41 removably mountable to a tarp frame 42. The tarp 40 extends in a roll-direction 43 to span the width of the vehicle bed 44 diagrammatically shown in phantom outline. The black dashed line showing the vehicle bed 44 is a top view of the trailer body superimposed over the tarp 40.

In this embodiment, the tarp frame 42 is shown in top or plan view and incorporates various features related to supporting the kinematic motion of the tarp 40. The tarp frame 42 essentially defines rectangular windows 45, which are in turn covered by the service panels 41. Generally, these service panels 41 primarily serve a covering function and are removably mounted on the tarp frame 42 and replaceable in the event of wear or damage.

As to the kinematic features of the tarp frame 42, the tarp frame 42 includes a suitable number of clocking straps 47 that extend across the sideward width of the tarp frame 42 from one side edge 42A to the opposite side edge 42B. These clocking straps 47 help force the path of the kinematic machine sidewardly over the trailer. Preferably, three clocking straps 47 are provided per tarp 40, which straps 47 are highly reinforced to provide sideward strength and support to the tarp 40.

On the one side edge 42B, a rotating axle pocket 48 is shown which is engagable with a tarp reel axle such as the reel 19 described above. The pocket 48 extends along the front to rear length of the tarp 40 as indicated by arrow 49. On this side edge 42B, reinforced material panels 50 are provided that stretch sidewardly beyond and over the side of vehicle bed 10A/44, and come into contact with trailer edge 35 on the lock down side of vehicle body or bed 10A.

On the opposite side edge 42A, additional reinforced material panels 51 are provided that stretch over the passenger or anchor side of the vehicle bed 10A/44 and come into contact with the trailer edge 34 on the stationary side of tarp 40. This side edge 42A also includes a stationary attachment pocket 53 for engaging the mechanical device which holds or anchors the tarp 40 to this side of the vehicle bed 10A. These features of the tarp frame 42 serve as kinematic or structural features that provide structural support to the tarp frame 42 and resist damage when contacting the bed edges 34 and 35. While providing structural support, these features are also flexible to allow rolling of the tarp frame 42 onto and off of the reel 12.

In addition to the functions provided by the tarp frame 42, the service panels 41 provide additional features related to load covering and sealing. As noted, the combination of the clocking straps 47 and reinforcement materials 50 and 51 define the windows 45, which are disposed between the reinforcement materials 50 and 51 in the sideward direction 43, and between the clocking straps 47 in the front to back direction 49.

These windows 45 are then covered by the service panels 41, which primarily serve a covering function. To removably attach the service panels 41 to the tarp frame 42, the peripheral edges of the service panels 41 and the windows 45 including cooperating fastener structures 55 that snap-connect together to define a zipper connection between the service panel edges and window edges. The fastener structures 55 are disclosed in more detail below relative to FIG. 4. The service panels 41 thereby primarily serve a covering function and are readily replaceable since they may have a shorter service life in comparison to the long-life non service items of the tarp frame 42.

Next, FIG. 3 is a plan view of a second embodiment of an automated tarp 60 having interlocking, edge-connected tarp panels 61 and 62. These tarp panels 61 and 62 are formed similar but have a reversed configuration to edge connect the tarp panels 61 and 62 in overlapping relation. The tarp 60 is extends in a roll-direction 63 to span the width of the vehicle bed 64 diagrammatically shown in phantom outline. The black dashed line showing the vehicle bed 64 is a top view of the trailer body superimposed over the tarp 60.

In this embodiment, each of the tarp panels 61 and 62 is shown in top or plan view and incorporates various features related to both supporting the kinematic motion of the tarp 60 and covering the central portion thereof to serve the covering function. Each tarp panel 61 and 62 includes common features, and common reference numerals are used for such common features where appropriate.

In more detail, each tarp panel 61 and 62 of the tarp 60 includes a peripheral reinforced section 65 which essentially defines a rectangular interior window 66, which in turn is covered by covering panels 67. The covering panels 67 are fixedly joined to the reinforced section 65 such as by sewing or by welding of the type suitable for the material of the covering panels 67.

As to the kinematic features of the reinforced section 65, the reinforced section 65 of each tarp panel 61 and 62 includes a suitable number of clocking straps 69 that extend across the sideward width of the tarp 60 from one side edge 60A to the opposite side edge 60B. These clocking straps 69 help force the path of the kinematic machine sidewardly over the trailer. Preferably, two clocking straps 69 are provided per tarp panel 61/62, which straps 69 are highly reinforced to provide sideward strength and support to the tarp 60.

On the one side edge 60B, a rotating axle pocket 70 is shown which is engagable with a tarp reel axle such as the reel 19 described above. The pocket 70 extends along the front to rear length of each tarp panel 61 and 62 as indicated by arrows 71. On this side edge 60B, reinforced material panels 73 are provided that stretch sidewardly beyond and over the side of vehicle bed 10A/44, and come into contact with trailer edge 35 on the lock down side of vehicle body or bed 10A.

On the opposite side edge 60A, additional reinforced material panels 74 are provided that stretch over the passenger or anchor side of the vehicle bed 10A/44 and come into contact with the trailer edge 34 on the stationary side of tarp 60. This side edge 60A also includes a stationary attachment pocket 75 for engaging the mechanical device which holds or anchors the tarp 60 to this side of the vehicle bed 10A. These features of the reinforced sections 65 serves as kinematic or structural features that provide structural support to the tarp 60 and resist damage when contacting the bed edges 34 and 35. While providing structural support, these features are also flexible to allow rolling of the tarp 60 onto and off of the reel 12.

In addition to the functions provided by the reinforced sections 65, the interior covering panels 67 provide additional features related to load covering and sealing. As noted, the combination of the clocking straps 69 and reinforcement materials 73 and 74 define the windows 66, which are disposed between the reinforcement materials 73 and 74 in the sideward direction 63, and between the clocking straps 69 in the front to back direction 71. These windows 66 are covered by the covering panels 67, which primarily serve a covering function and are fixed in place by sewing or welding.

In this embodiment, each of the tarp panels 61 and 62 are edge connected together by cooperating fastener structures 76 that are sewn or welded to adjacent, overlapping panel edges 61A and 62A to provide a snap-connect zipper connection between the overlapped tarp panel edges 61A and 62A. The fastener structures 76 are disclosed in more detail below relative to FIG. 4. The tarp panels 61 and 62 thereby serve both a kinematic function and a covering function and are individually replaceable by detaching the fastener structures 76 and removing any damaged tarp panel 61 or 62 and replacing with another tarp panel of the same construction.

Turning to the fastener structures 55/76, FIG. 4 is an end view of a first embodiment of an interlocking panel connector for the first and second embodiments of the inventive tarp. Each of these fastener structures have a common, interlocking profile as shown in this end view and vary in length depending upon the location in which the fastener structures 55 or 76 are installed.

Each of the fastener structures 55/76 is formed by connectors 78 and 79 which are both formed of the same extruded material. The connectors or extrusions 78 and 79 are preferably formed of polypropylene, TPE or similar over mold features that are extruded over seat belt webbing reinforcements to define cuttable lengths of connector material. The connectors 78 and 79 include barbed posts 80 and flanges 81 which features will snap together or slide together to form a locking attachment. The locking attachment is flexible and can be rolled up on a reel or axle without taking a set.

These extrusions can be permanently attached to fabric, sheet media and tarp media using traditional means such as welding or sewing. Alternatively, using an adhesive backer tape, these extrusions can be mounted directly to any hard surface to form an attachment anchor that a fabric panel can be attached to. In the embodiment of FIG. 3, the connectors 78 are provided around the periphery of the service panels 41, and the connectors 79 are provided around the periphery of the windows 45. This allows the service panels 41 to be snap connected to the windows 45 in accord with the foregoing disclosure. In the embodiment of FIG. 4, the connectors 78 are provided along the length of the panel edge 61A and the connectors 79 are provided along the length of the panel edge 62A. This allows the one tarp panel 61 to be snap connected to the adjacent tarp panel 62 by overlapping the edges 61A and 62A and snapping the connectors 78 and 79 together in accord with the foregoing disclosure. These features allow fabric or sheet connection to be easily attached to one another, and allow fabric or sheet connection to be easily removed from one another.

Referring to FIGS. 5-15, FIG. 5 is a plan view of a third embodiment of an automated tarp 90 of the present invention having service panels 91 removably mountable to a tarp frame 92. The tarp 90 extends in a roll-direction 93 to span the width of the vehicle bed 94 diagrammatically shown in phantom outline. The black dashed line showing the vehicle bed 94 is a top view of the trailer body superimposed over the tarp 90.

In this embodiment, the tarp frame 92 is shown in top or plan view and incorporates various features related to supporting the kinematic motion of the tarp 90. The tarp frame 92 preferably defines three or more rectangular windows 95, which are in turn covered by respective service panels 91. Generally, these service panels 91 primarily serve a covering function and are removably mounted on the tarp frame 92 and replaceable in the event of wear or damage.

As to the kinematic features of the tarp frame 92, the tarp frame 92 includes a suitable number of clocking straps 97 that extend across the sideward width of the tarp frame 92 from one side edge 92A to the opposite side edge 92B. These clocking straps 97 help force the path of the kinematic machine sidewardly over the vehicle bed 94. Preferably in this embodiment, four clocking straps 97 are provided per tarp 60, wherein one clocking strap 97 is provided at each opposite tarp end and one clocking strap 97 is provided between each pair of windows 95. The straps 97 are highly reinforced to provide sideward strength and support to the tarp 90.

On the one side edge 92B, a rotating axle pocket 98 is shown which is engagable with a tarp reel axle such as the reel 19 described above. The pocket 98 extends along the front to rear length of the tarp 90 as indicated by arrow 99. On this side edge 92B, reinforced material panels 100 are provided that stretch sidewardly beyond and over the side of vehicle bed 10A/44, and come into contact with trailer edge 35 on the lock down side of vehicle body or bed 10A.

On the opposite side edge 92A, additional reinforced material panels 101 are provided that stretch over the passenger or anchor side of the vehicle bed 10A/44 and come into contact with the trailer edge 34 on the stationary side of tarp 90. This side edge 92A also includes a stationary attachment pocket 103 for engaging the mechanical device which holds or anchors the tarp 90 to this side of the vehicle bed 10A. These features of the tarp frame 92 serve as kinematic or structural features that provide structural support to the tarp frame 92 and resist damage when contacting the bed edges 34 and 35. While providing structural support, these features are also flexible to allow rolling of the tarp frame 92 onto and off of the reel 12.

In addition to the functions provided by the tarp frame 92, the service panels 91 provide additional features related to load covering and sealing. As noted, the combination of the clocking straps 97 and reinforcement materials 100 and 101 define the windows 95, which are disposed between the reinforcement materials 100 and 101 in the sideward direction 93, and between the clocking straps 97 in the front to back direction 99.

These windows 95 are then covered by the service panels 91, which primarily serve a covering function. To removably attach the service panels 91 to the tarp frame 92, the peripheral edges of the service panels 91 and the windows 95 including cooperating fastener structures 105 that snap-connect together to define a zipper connection between the service panel edges and window edges. The fastener structures 105 are disclosed in more detail below relative to FIG. 6. The service panels 91 thereby primarily serve a covering function and are readily replaceable since they may have a shorter service life in comparison to the long-life non service items of the tarp frame 92.

Figure 6:
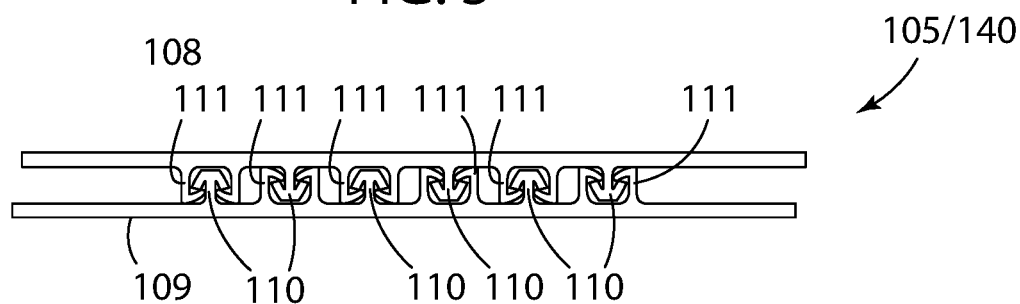
FIG. 6 is an end view of a second embodiment of an interlocking panel connector for the third and fourth embodiments of the inventive tarp.

Turning to the fastener structures 105, FIG. 6 is an end view of a second embodiment of an interlocking panel connector for the third embodiment of the inventive tarp. Each of these fastener structures have a common, interlocking profile as shown in this end view and vary in length depending upon the location in which the fastener structures 105 are installed.

Each of the fastener structures 105 is formed by connectors 108 and 109 which are both formed of the same extruded material. The connectors 108 and 109 are preferably formed of polypropylene, TPE or similar over mold features that are extruded metal foil, which provides tensile strength and supports the kinematic travel path of the tarp through a duty cycle. The extruded material defines cuttable lengths of connector material. The connectors 108 and 109 include barbed posts 110 and pairs of flanges 111 which features will snap together or slide together to form a locking attachment between the tarp frame 92 and each service panel 91. The locking attachment is flexible and can be rolled up on an axle without taking a set.

The features of the posts 110 and flanges 11 as well as the connector material makes the connectors 108 and 109 suitable for a range of operating temperatures and conditions.

These extrusions can be permanently attached to fabric, sheet media and tarp media using traditional means such as welding or sewing. Alternatively, using an adhesive backer tape, these extrusions can be mounted directly to any hard surface to form an attachment anchor that a fabric panel can be attached to.

Figure 5:
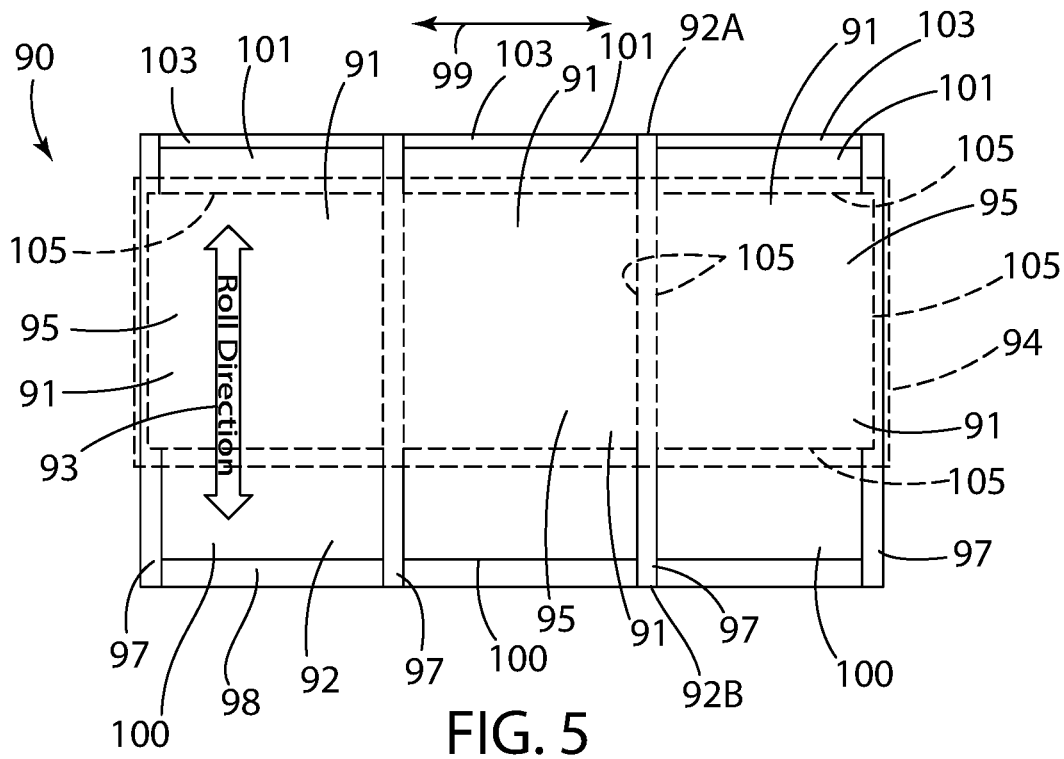
FIG. 5 is a plan view of a third embodiment of an automated tarp having service panels removably mountable to a tarp frame.
Figure 7:
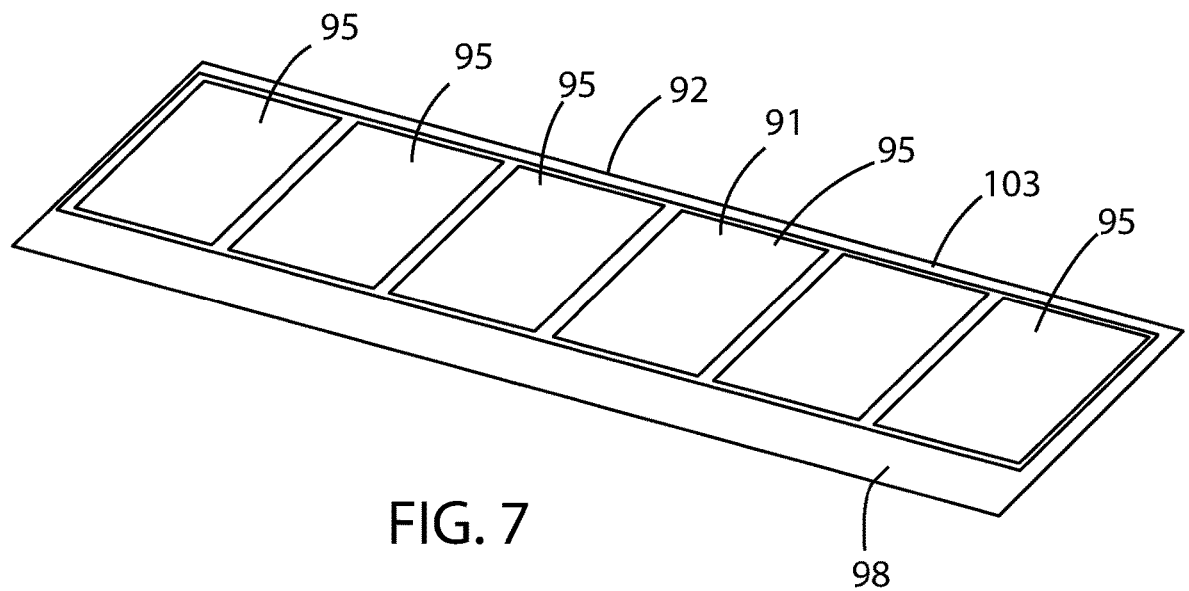
FIG. 7 is perspective view of the tarp frame of FIG. 5.

FIG. 7 is perspective view of the tarp frame 92 of FIG. 5 showing the tarp frame 92 in an alternate configuration with three to six windows 95. In more detail, the tarp frame 92 is formed of wear resistant material such as ballistic nylon that is required to contact trailer surfaces such as the bed edges 34 and 35. In this design, Kedar strips may be used at locations 98 and 103 to attach the tarp frame 92 to the reel 12 and vehicle bed 10A although a typical axle pocket and stationary tube pocket could be utilized as described above. This tarp frame 92 serves to force the path of the arm assembly and kinetic machinery over the vehicle bed 10A as described above. Generally, the tarp frame 92 is intended to last a very long time and is considered to be non-serviceable.

Figure 8:
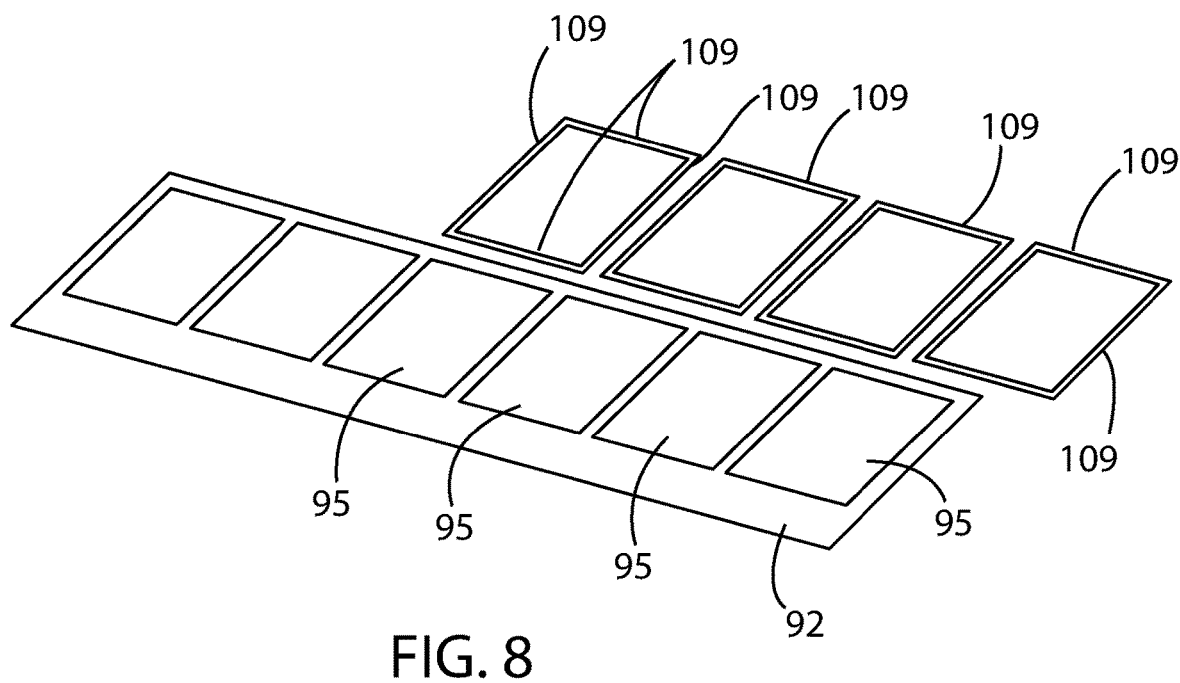
FIG. 8 is a perspective view of the tarp frame with an assembly of tarp connectors positioned for mounting to the tarp frame.
Figure 9:
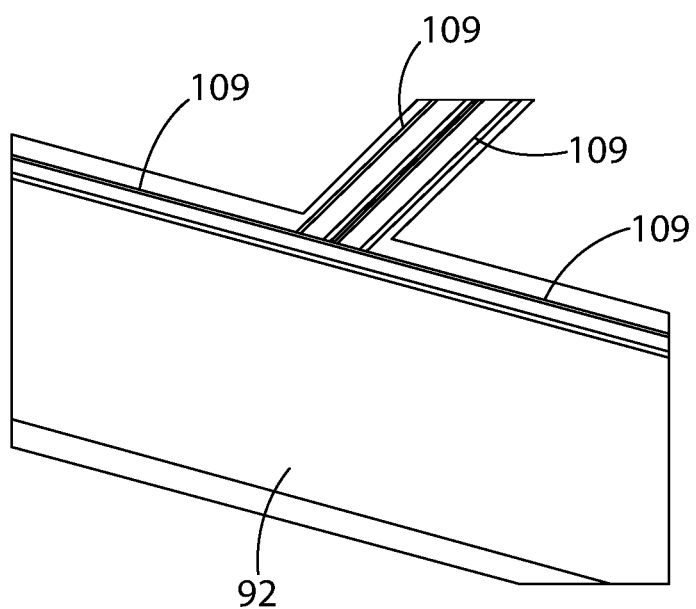
FIG. 9 is an enlarged fragmentary view of the panel connectors mounted to the tarp frame.
Figure 10:
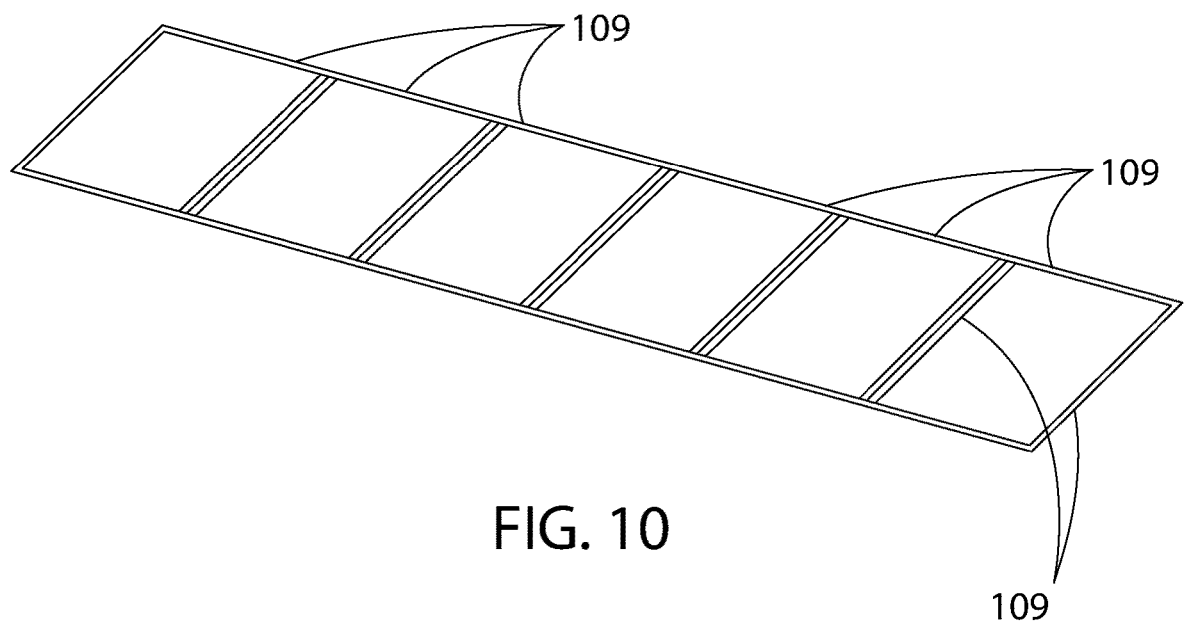
FIG. 10 is a perspective view of a complete pattern of panel connectors separated from the tarp frame.
Figure 11:
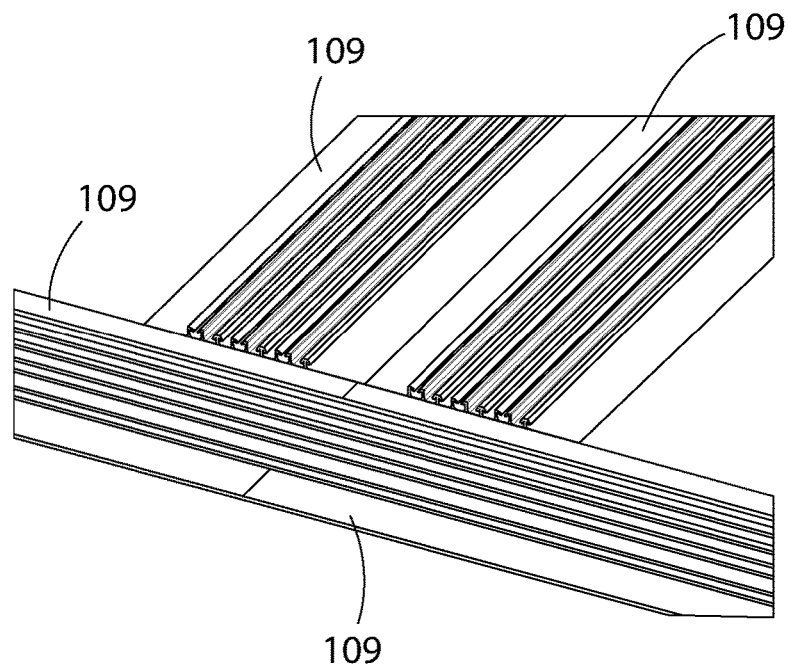
FIG. 11 is an enlarged fragmentary of the panel connectors positioned for mounting on the tarp frame.

FIG. 8 is a perspective view of the tarp frame 92 with an assembly of tarp connectors 109 positioned for mounting to the tarp frame 92. Preferably, the complete layout of tarp connectors 109 will be sewn separately to the tarp frame 92 along the periphery of each window 95. The service panel openings or windows 95 on the tarp frame 92 will include a properly located lock connector layout positioned on the top side to act as the attachment point with the actual service panel 91. Preferably, four pieces of tarp connectors 109 are arranged in a rectangular frame around each window 95. FIG. 9 is an enlarged fragmentary view of the panel connectors 109 mounted to the tarp frame 92, wherein the connectors 109 are configured with butt joints at the window corners. FIG. 10 is a perspective view of a complete pattern of panel connectors 109 separated from the tarp frame 92. FIG. 11 is an enlarged fragmentary of the panel connectors 109 positioned for mounting on the tarp frame 92, which has been omitted for illustrative purposes. When the panel connectors 109 are mounted to the tarp frame 92, these components define a subassembly alternatively referenced as the tarp support frame assembly.

Figure 12:
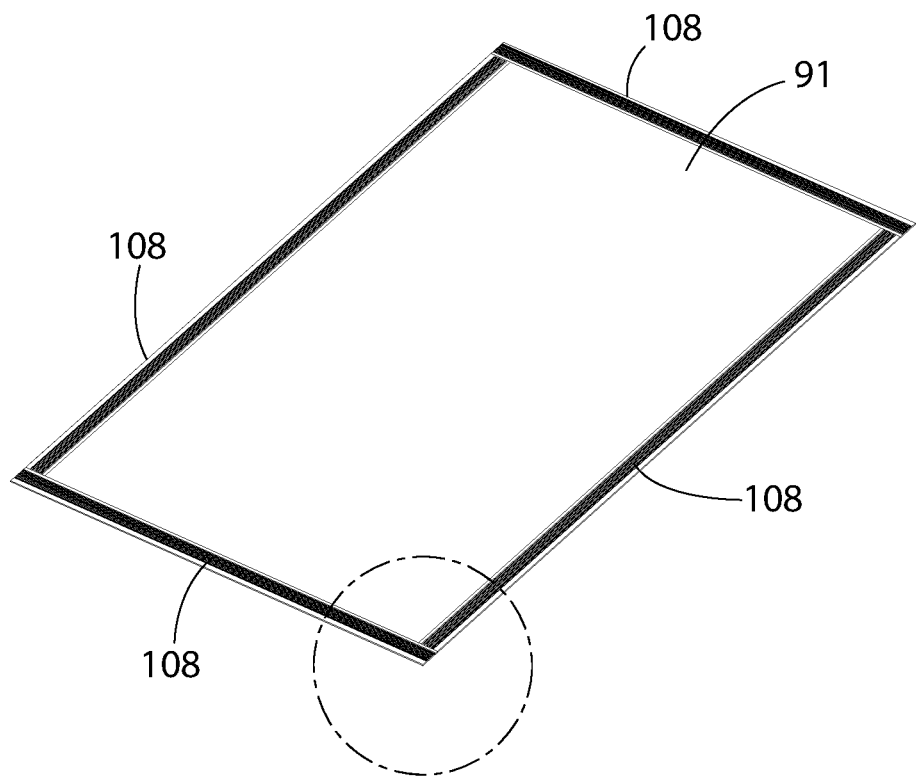
FIG. 12 is a perspective view of a service panel.
Figure 13:
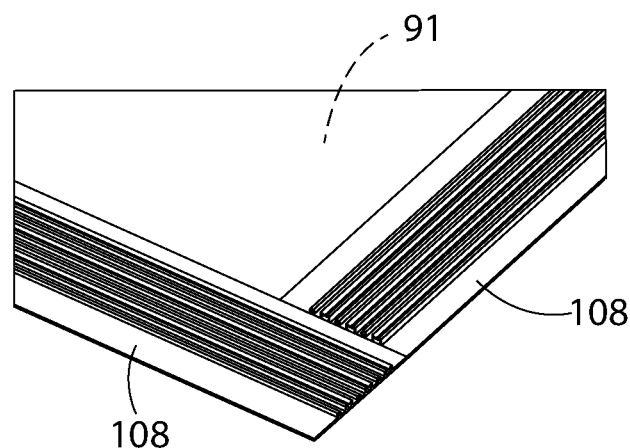
FIG. 13 is an enlarged, fragmentary perspective view of the panel connectors mounted on the service panel.

Next, FIG. 12 is a perspective view of a service panel 91 having panel connectors 108 connected to the bottom surface thereof. FIG. 13 is an enlarged, fragmentary perspective view of the panel connectors 108 mounted on the service pane 91, preferably by sewing. The number of service panels 91 can vary and will be three or more per tarp 90. The service panel 91 is considered to be the serviceable or replaceable covering section of the tarp 90.

Figure 14:
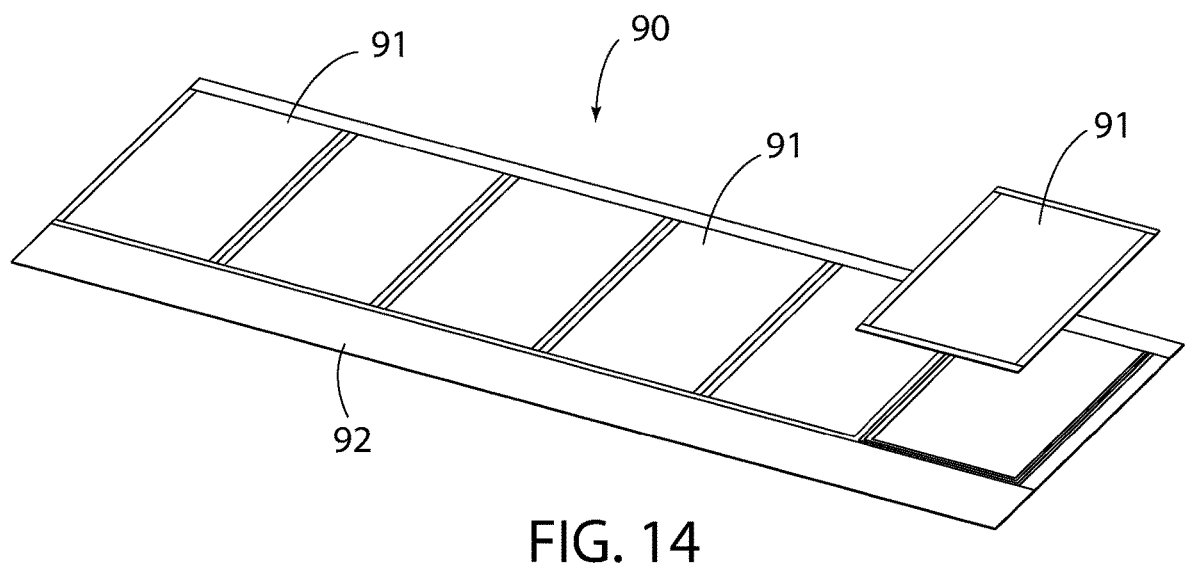
FIG. 14 is a perspective view of multiple service panels being mounted to the tarp frame.
Figure 15:
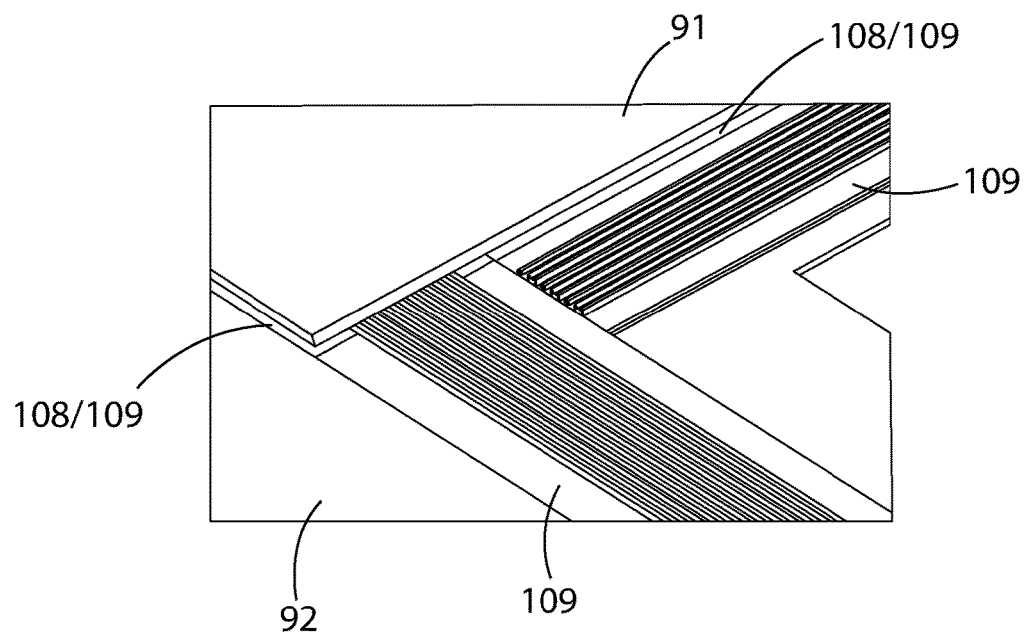
FIG. 15 is an enlarged, fragmentary perspective view of a service panel mounted to the panel connectors on the tarp frame.
Figure 16:
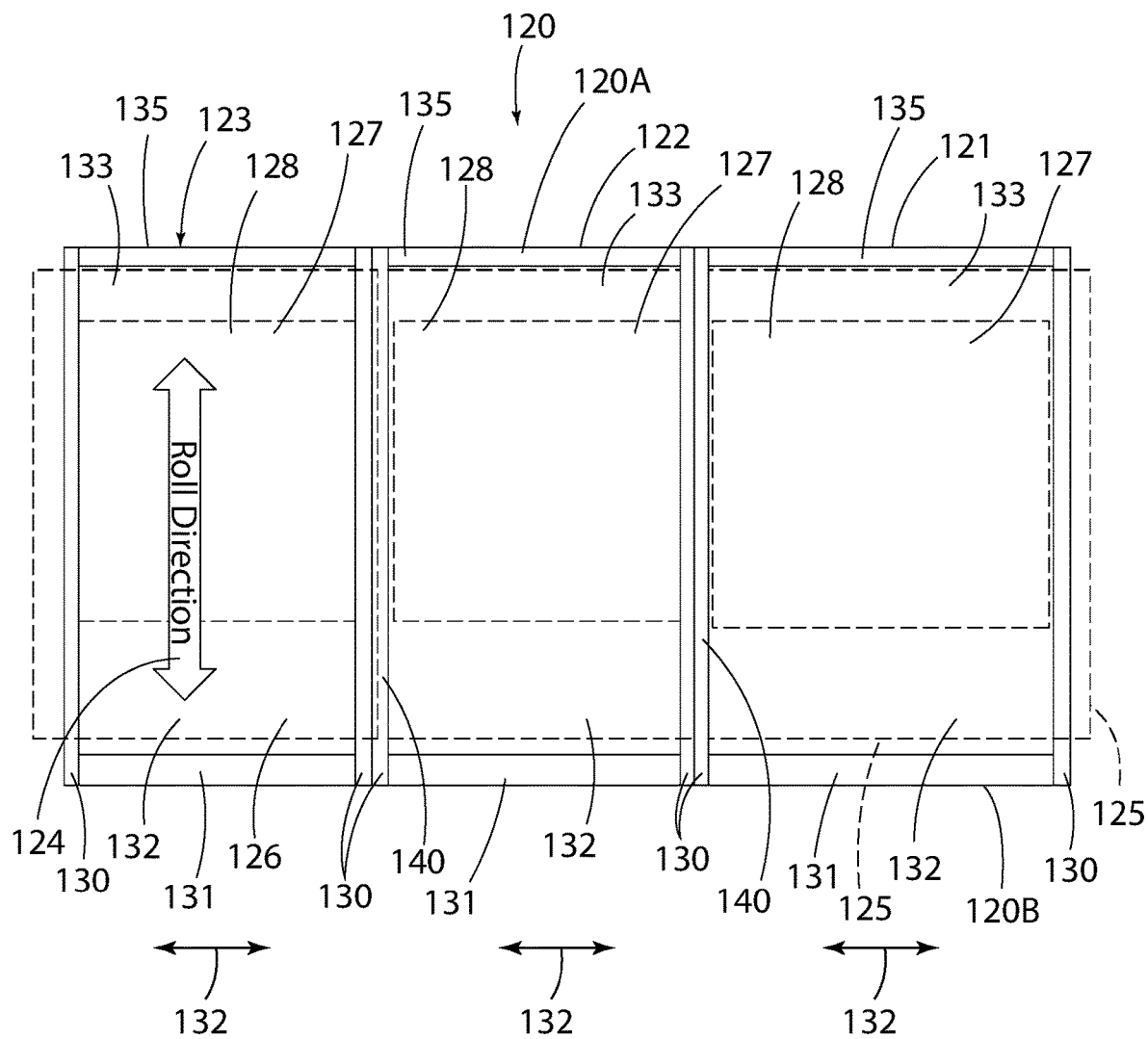
FIG. 16 is a plan view of a fourth embodiment of an automated tarp having interlocking, edge-connected tarp panels removably mounted together.

FIG. 14 is a perspective view of multiple service panels 91 being mounted to the tarp frame 92. FIG. 15 is an enlarged, fragmentary perspective view of a service panel 91 mounted to the panel connectors 109 on the tarp frame 92, wherein the interlocked connectors 108/109 join the service panel 91 to the tarp frame 92. This connection of the tarp panel or tarp panel assembly 91 and the tarp frame or tarp frame assembly 92 will create the tarp 90.

With this configuration, the assembled tarp 90 can be connected to the vehicle bed 10A by Kedar and/or tarp pockets at the edge sections 98 and 103. With this design, the individual service panels or panel assemblies 91 are easily replaced. The benefits are less downtime, smaller replacement cost, ease of installation, readily available stocked panels 91, light weight and manageable, reduced change over time.

In the embodiment of FIG. 16-21, a fourth embodiment of an automated tarp 120 is shown having interlocking, edge-connected tarp panels, which generally comprise a front panel 121, one or more interior panels 122 and a rear panel 123. These tarp panels 121-123 are formed similar but have different configuration to edge connect the tarp panels 121-123 in overlapping relation. The tarp 120 is extends in a roll-direction 124 to span the width of the vehicle bed 125 diagrammatically shown in phantom outline. The black dashed line showing the vehicle bed 125 is a top view of the trailer body superimposed over the tarp 120.

In this embodiment, each of the tarp panels 121-123 are shown in top or plan view and incorporate various features related to both supporting the kinematic motion of the tarp 120 and covering the central portion thereof to serve the covering function. Each tarp panel 121-123 includes common features, and common reference numerals are used for such common features where appropriate.

In more detail, each tarp panel 121-123 of the tarp 120 includes a peripheral reinforced section 126 which essentially defines a rectangular interior window 127, which in turn is covered by covering panels 128. The covering panels 128 are fixedly joined to the reinforced section 126 such as by sewing or by welding of the type suitable for the material of the covering panels 128. Generally, these interior covering panels 128 primarily serve a covering function and are removably mounted on the reinforced section 126.

As to the kinematic features of the reinforced section 126, the reinforced section 126 of each tarp panel 121-123 includes a suitable number of clocking straps 130 that extend across the sideward tarp width from one side edge 120A to the opposite side edge 120B. These clocking straps 130 help force the path of the kinematic machine sidewardly over the trailer. Preferably, two clocking straps 130 are provided per tarp panel 121-123, which straps 130 are highly reinforced to provide sideward strength and support to the tarp 120.

On the one side edge 120B, an attachment section 131 is shown which is engagable with a tarp reel axle such as the reel 19 described above. This individual panel edge attachment section 131 may be clamped to the reel or axle using tarp clips or other mechanism. While this particular structure is not a pocket attachment, it may be made in such manner as described above. Removing the tarp clips or other clamping mechanism frees this panel edge section 1321 from the axle. The attachment section 131 extends along the front to rear length of each tarp panel 121-123 as indicated by arrows 132. On this side edge 120B, reinforced material panels 132 are provided that are made of heavy duty material and stretch sidewardly beyond and over the side of vehicle bed 10A/44, and come into contact with trailer edge 35 on the lock down side of vehicle body or bed 10A.

On the opposite side edge 120A, additional reinforced material panels 133 are provided of heavy duty material that stretch over the passenger or anchor side of the vehicle bed 10A/44 and come into contact with the trailer edge 34 on the stationary side of tarp 120. This section can also contain an inner tarp flap which purpose is to reduce load damage to stationary pipe by shedding the load material off the stationary pipe. This side edge 120A also includes a stationary attachment pocket 135 for engaging the mechanical device which holds or anchors the tarp 120 to this side of the vehicle bed 10A. Each panel will have its individual stationary pipe and individual pair of tarp stop brackets which fasten the tarp stop and stationary pipe and respective panel to the side of trailer 10A. Removing the pair of tarp stop brackets allows this panel edge to become free from the trailer. These features of the reinforced sections serves as kinematic or structural features that provide structural support to the tarp 120 and resist damage when contacting the bed edges 34 and 35. While providing structural support, these features are also flexible to allow rolling of the tarp 120 onto and off of the reel 12.

In addition to the functions provided by the reinforced sections 126, the interior covering panels 128 provide additional features related to load covering and sealing. As noted, the combination of the clocking straps 130 and reinforcement materials 132 and 133 define the windows 127. These windows 127 are covered by the covering panels 128, which primarily serve a covering function and are fixed in place by sewing or welding. The covering panels 128 represent less reinforced tarp media that is not intended for contact with the vehicle bed or truck frame. This material is sewn or welded to the reinforced areas 132 and 133 of each individual tarp panel.

Figure 17:
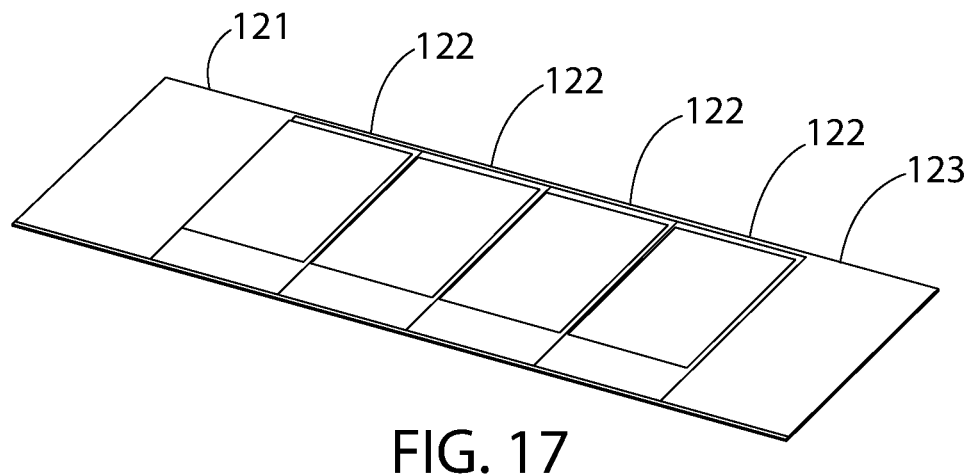
FIG. 17 is a perspective view of the tarp with the tarp panels mounted together.
Figure 18:
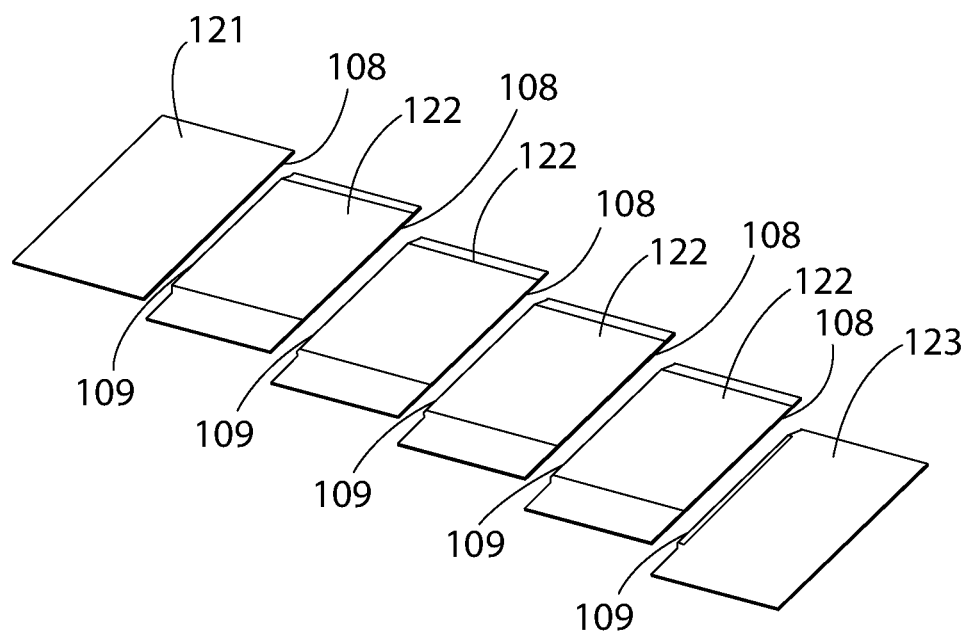
FIG. 18 is perspective view of the tarp of FIG. 16 with the tarp panels positioned for assembly.

In this embodiment, each of the tarp panels 121-123 are edge connected together by cooperating fastener structures 140 that are sewn or welded to adjacent, overlapping panel edges of the panels 121-123 to provide a snap-connect, zipper connection between the overlapped tarp panel edges. The fastener structures 140 are disclosed in more detail above relative to FIG. 6 and have the same construction as fastener structures 105 reference in such figure. Generally as seen in FIGS. 17 and 18, the overlapped areas are overlapped and press together to define a connection between and joining each individual tarp panel assembly 121-123 to one another. This overlapped connection will be on the top forward edge and bottom rear edges of each interior tarp panel assembly 122. This connection feature is only on the bottom rear edge of the front tarp panel assembly 121, and this connection feature is only on the top front edge of the rear tarp panel assembly 123. As such, the panels 121-123 will overlap each other to streamline the construction against wind intrusion, wherein the rear edge of the front panel 121 will snap on top of the forward edge of the first interior service panel 122, the first interior panel rear edge will snap on top of the forward edge of the second interior service panel 122 and so on. Lastly, the rear edge of the last interior service panel 122 will snap on top of the forward edge of the rear service panel 123 as seen in FIG. 18. This snap together connection of the panels 121-123 to one another will extend to the outside of the trailer body width. The tarp panels 121-123 in an assembled tarp will have loose edges extending from the trailer body area to the axle and stationary pipe connection at locations 131 and 135, wherein this short length extending past the trailer body or vehicle bed 125 on each side is not required to be a sealed area of the tarp system.

The tarp panels 121-123 thereby serve both a kinematic function and a covering function and are individually replaceable by detaching the fastener structures 140 and removing any damaged tarp panel 121-123 and replacing with another tarp panel of the same construction.

In accordance with the disclosure of FIG. 6, the fastener structures 140 are formed by connectors 108 and 109 which are both formed of the same extruded material. The connectors 108 and 109 are preferably formed of polypropylene, TPE or similar over mold features that are extruded metal foil, which provides tensile strength and supports the kinematic travel path of the tarp through a duty cycle. The extruded material defines cuttable lengths of connector material. The connectors 108 and 109 include barbed posts 110 and pairs of flanges 111 which features will snap together or slide together to form a locking attachment between the tarp panels 121-123. The locking attachment is flexible and can be rolled up on an axle without taking a set.

In the embodiment of FIG. 18, the connectors 108 and 109 are provided along the length of adjacent panel of the panels 121-123 as generally shown therein. This allows each tarp panel to be snap connected to the adjacent tarp panel by overlapping the edges and snapping the connectors 108 and 109 together in accord with the foregoing disclosure. These features allow fabric or sheet connection to be easily attached to one another, and allow fabric or sheet connection to be easily removed from one another.

Figures 19A, 19B:
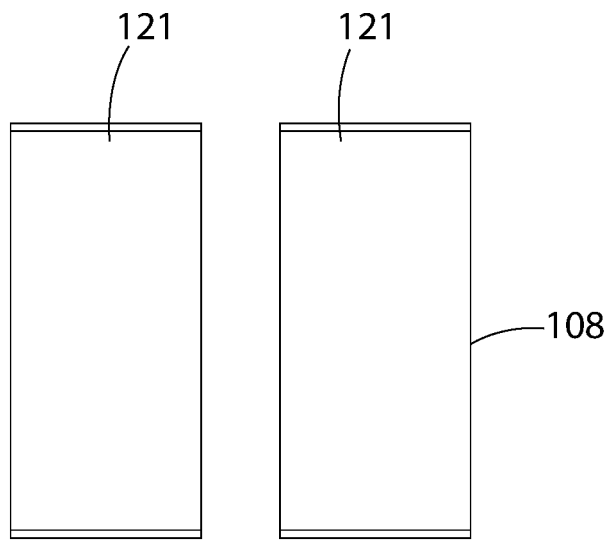
FIGS. 19A and 19B illustrate opposite top and bottom sides of a front tarp panel.

Next, FIGS. 19A and 19B illustrate opposite top and bottom sides of a front tarp panel 121 with connectors 109 on the top side on the rear edge. The front panel uses a durable material chosen to be very robust, durable and long lasting such as ballistic nylon or the like. This panel 121 incorporates a front edge underbody reinforcement for strength and timing such as weldable webbing. This panel 121 includes the connector 108 on the bottom for reinforcement for strength and snap connection with a rear adjacent panel 122 with the front panel 121 above the interior panel 122.

Figures 20A, 20B:
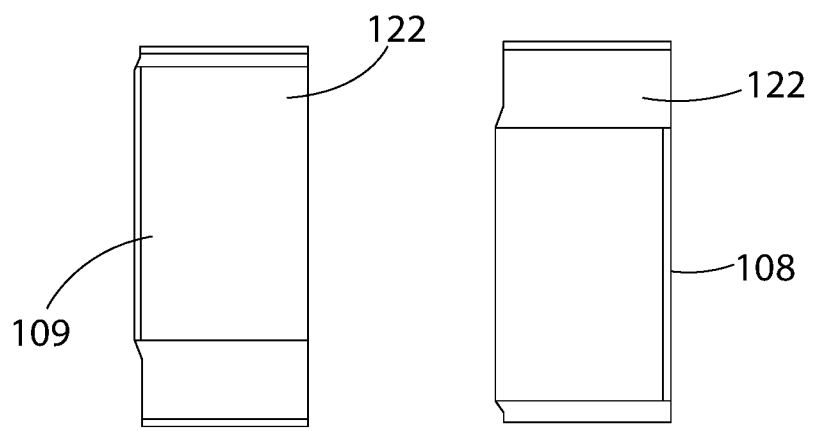
FIGS. 20A and 20B illustrate opposite top and bottom sides of an interior tarp panel.

FIGS. 20A and 20B illustrate opposite top and bottom sides of an interior tarp panel 122 with the connectors 109 on the top side along the front edge and the connectors 108 on the bottom side along the rear edge to overlap above each adjacent panel.

Figures 21A, 21B:
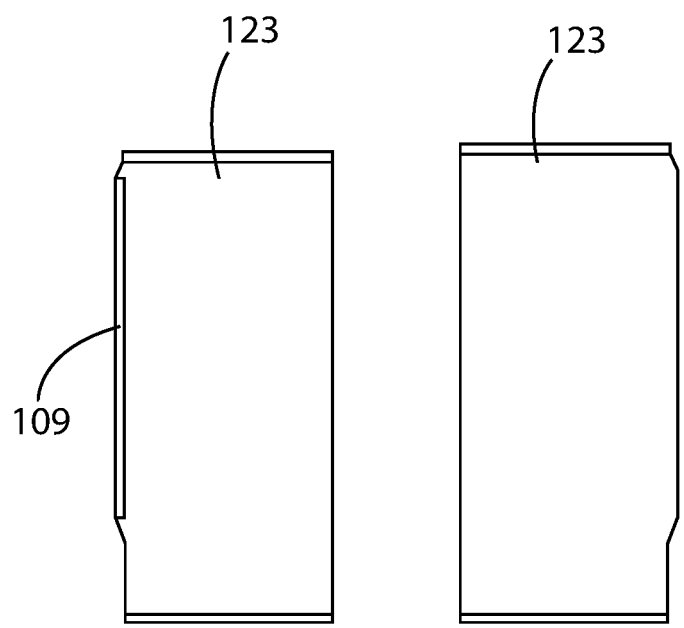
FIGS. 21A and 21B illustrate opposite top and bottom sides of a rear tarp panel.

FIGS. 21A and 21B illustrate opposite top and bottom sides of a rear tarp panel 123 with the connector 109 along the front edge on the top side so as to be overlapped by an interior panel 122 located toward the front thereof.

With these configurations, an improved panel construction is provided.

Although particular preferred embodiments of the invention have been disclosed in detail for illustrative purposes, it will be recognized that variations or modifications of the disclosed apparatus, including the rearrangement of parts, lie within the scope of the present invention.

We claim:

1. A tarp for a covering system for extending and retracting a tarp over a vehicle bed of a vehicle, the tarp comprising:
   a tarp frame comprising reinforced materials along opposite side edges of said tarp and across a width of said tarp to define window areas therebetween; and
   covering panels which are attached over said window areas to enclose said windows and perform a covering function;
   wherein said tarp frame comprises first and second side edge sections and clocking straps extending sidewardly therebetween, said first and second side edge sections formed of a reinforced material adapted for contact with upper edges of a vehicle bed and defining said window areas and said covering panels define service panels that are removably engaged with said tarp frame.

2. The tarp according to claim 1, wherein said tarp frame and said service panels include cooperating fasteners which removably connect said service panels to said tarp frame.

3. The tarp according to claim 1, wherein tarp frame and said covering panels are flexible.

4. The tarp according to claim 1, wherein said tarp frame and said covering panels are joined together and defined by a plurality of edge connected tarp panels.

5. The tarp according to claim 4, wherein each of said tarp panels comprises respective portions of said tarp frame which each comprise one said window area and a respective said covering panel non-removably fixed over said window area.

6. The tarp according to claim 5, wherein said tarp panels comprise a front tarp panel, one or more interior tarp panels, and a rear panel with said front and rear tarp panels defining front and rear ends of said tarp and each connected to at least one said interior tarp panel.

7. A tarp for a covering system for extending and retracting a tarp over a vehicle bed of a vehicle, the tarp comprising:
   a tarp frame comprising reinforced materials along opposite side edges of said tarp and across a width of said tarp to define window areas therebetween; and
   covering panels which are attached over said window areas to enclose said windows and perform a covering function, wherein said tarp frame comprises a plurality of said window areas, and said tarp comprises one said covering panel removably engaged to cover each said window area, said covering panel being removable and replaceable.

8. A tarp for a covering system for extending and retracting a tarp over a vehicle bed of a vehicle, the tarp comprising:
   a tarp frame comprising reinforced materials along opposite first and second side edges of said tarp and across a width of said tarp to define window areas therebetween, wherein said reinforced materials along said side edges resist contact with bed edges of a vehicle bed, said tarp frame further comprises straps extending sidewardly between said side edges to support said tarp when spanning said bed edges; and
   covering panels which are attached over said window areas to enclose said windows and perform a covering function, wherein said first and second side edges define said window areas, and said covering panels define service panels that are removably engaged with said tarp frame.

9. The tarp according to claim 8, wherein said straps are clocking straps.

10. The tarp according to claim 8, wherein said tarp frame and said service panels include cooperating fasteners which removable connect said service panels to said tarp frame.

11. The tarp according to claim 8, wherein tarp frame and said covering panels are flexible.

12. The tarp according to claim 8, wherein said tarp frame and said covering panels are joined together and defined by a plurality of edge connected tarp panels.

13. The tarp according to claim 12, wherein each of said tarp panels comprises respective portions of said tarp frame which each comprise one said window area and a respective said covering panel non-removably fixed over said window area.

14. The tarp according to claim 13, wherein said tarp panels comprise a front tarp panel, one or more interior tarp panels, and a rear panel with said front and rear tarp panels defining front and rear ends of said tarp and each connected to at least one said interior tarp panel.

15. A tarp for a covering system for extending and retracting a tarp over a vehicle bed of a vehicle, the tarp comprising:
   a tarp frame comprising reinforced materials along opposite first and second side edges of said tarp and across a width of said tarp to define window areas therebetween, wherein said reinforced materials along said side edges resist contact with bed edges of a vehicle bed, said tarp frame further comprises straps extending sidewardly between said side edges to support said tarp when spanning said bed edges; and
   covering panels which are attached over said window areas to enclose said windows and perform a covering function, wherein said tarp frame comprises a plurality of said window areas, and said tarp comprises one said covering panel removably engaged to cover each said window area, said covering panel being removable and replaceable.

\* \* \* \* \*